United States Patent [19]

Dee et al.

[11] Patent Number: 5,034,089

[45] Date of Patent: Jul. 23, 1991

[54] METHOD OF MANUFACTURING A MULTI-TURN MULTI-TRACK COMPOSITE RECORDING HEAD

[75] Inventors: Richard H. Dee, Louisville; Richard F. M. Thornley, Boulder; Marybelle C. Blakeslee, Golden, all of Colo.

[73] Assignee: Storage Technology Corporation, Louisville, Colo.

[21] Appl. No.: 571,935

[22] Filed: Aug. 23, 1990

[51] Int. Cl.$^5$ .......................... B44C 1/22; C23F 1/02; B29C 37/00
[52] U.S. Cl. .................................. 156/633; 156/634; 156/655; 156/656; 156/659.1; 29/603; 360/119
[58] Field of Search ................ 29/603, 606; 156/629, 156/633, 634, 643, 655, 656, 657, 659.1, 661.1, 667; 360/110, 119, 120, 121, 122, 123

[56] References Cited

U.S. PATENT DOCUMENTS 4,731,157  3/1988  Lazzari ........................ 29/603 X Primary Examiner—William A. Powell
Attorney, Agent, or Firm—Dorr, Carson, Sloan & Peterson

[57] ABSTRACT

This method of manufacturing a multi-turn multi-track composite recording head increases the cross sectional area of the conductors used to implement the windings in the recording head. This is accomplished by etching a recess into the ferrite substrate of the first ferrite magnetic pole piece to receive the winding. This recess may be deep enough to incorporate the entirety of the winding. This configuration does not constrain the gap size but simply increases the space into which the winding is placed. The thickness of the winding deposited in this space is no longer constrained by the dimensions of the gap but can be equal to the gap dimension plus the depth of the recess etched into the ferrite substrate.

7 Claims, 3 Drawing Sheets

METHOD OF MANUFACTURING A MULTI-TURN MULTI-TRACK COMPOSITE RECORDING HEAD

FIELD OF THE INVENTION

This invention relates to magnetic tape drives and, in particular, to a method of manufacturing a multi-turn multi-winding composite recording head that uses thin film techniques to produce the windings therein.

PROBLEM

It is a problem in the field of magnetic tape drives to manufacture recording heads that have the proper electrical and magnetic characteristics. A magnetic tape drive recording head is typically a composite structure that incorporates multiple recording windings into a single recording head. The recording windings are each fabricated using a pair of ferrite magnetic pole pieces. A first ferrite magnetic pole piece is used as a substrate onto which an insulator is deposited to provide a gap of predetermined dimensions between the first ferrite magnetic pole piece and a second mating ferrite magnetic pole piece. The recording head coil winding is manufactured by etching, using a photoresist process and a chemical etching process, the insulator that was deposited on the surface of the first ferrite magnet pole piece in the pattern of the winding to expose the ferrite substrate. The conductor that forms the winding is then deposited in the pattern etched into the insulator to implement one recording head winding. The second ferrite magnetic pole piece is then juxtaposed with the first ferrite magnetic pole piece.

A significant difficulty with this arrangement is that the gap dimensions are small and limit the thickness of the conductor that can be deposited in the gap region between the two ferrite magnetic pole pieces. The other dimension of the conductor is also constrained due to the fact that it is desirable to have a large number of turns in the limited space provided. Therefore, these two requirements mandate the use of larger conductors to implement the windings which presently have a fixed maximum cross sectional area and therefore a limited minimum resistance, which limits the design of the recording head and its associated drive circuitry.

SOLUTION

The above described problems are solved and a technical advance achieved in the field by the method of manufacturing a multi-turn multi-track composite recording head which increases the cross sectional area of the conductors used to implement the windings in the recording head. This is accomplished by etching a recess into the ferrite substrate of the first ferrite magnetic pole piece to receive the winding. This recess is sized to incorporate most of or the entirety of the winding. This configuration does not vary the gap size but simply increases the size of the region into which the winding is placed. The thickness of the winding deposited in this space is no longer constrained by the dimensions of the gap but can be equal to the gap dimension plus the depth of the recess etched into the ferrite substrate. The use of this recess significantly increases the cross sectional area of the conductor thereby proportionately reducing the resistance thereof without varying the gap size, modifying the number of windings nor unduly complicating the manufacturing process.

DETAILED DESCRIPTION

Figure 1:
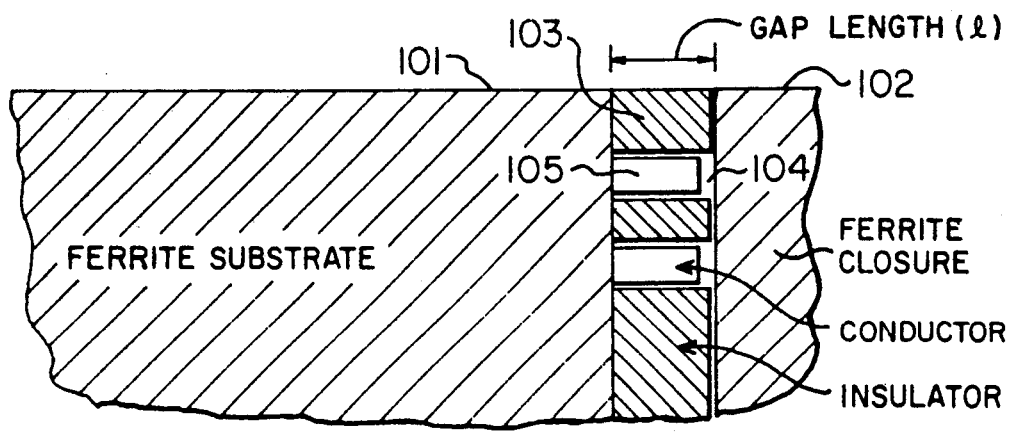
FIG. 1 illustrates a typical prior art recording head in cross section view.

Recording heads for multiple track magnetic tape drives are fabricated using a pair of ferrite magnetic pole pieces between which is placed the multi-turn winding 104 of the recording head. This prior art recording head (FIG. 1) is typically fabricated by taking a first ferrite magnetic pole piece 101 and depositing an insulator 103 thereon using thin film deposition techniques. The insulator provides a predetermined length gap (1) between the first ferrite magnetic pole piece 101 and the mating second ferrite magnetic pole piece 102. A photoresist is applied to the insulator that is deposited on the first ferrite magnetic pole piece 101 and exposed to produce the pattern of the desired winding 104. The exposed area of the photo resist is etched to remove the insulator 103 so that the ferrite substrate 101 is exposed in the pattern of the multi-turn winding 104. A thin film conductor 105 is deposited into this exposed pattern area. The resultant multi-turn winding 104 is fabricated by using thin film techniques but is limited in that the conductor 105 is restricted in thickness by the desired gap length (1). This limitation on conductor 105 cross section area limits how low the winding resistance can be once the number of turns of the recording head winding 104 and number of elements is selected. The number of turns is a function of a number of operating parameters and once the number of turns have been selected to satisfy these parameters the recording head resistance is fixed by this limitation on the cross sectional area on the conductor 105 used to implement the recording head.

Figure 2:
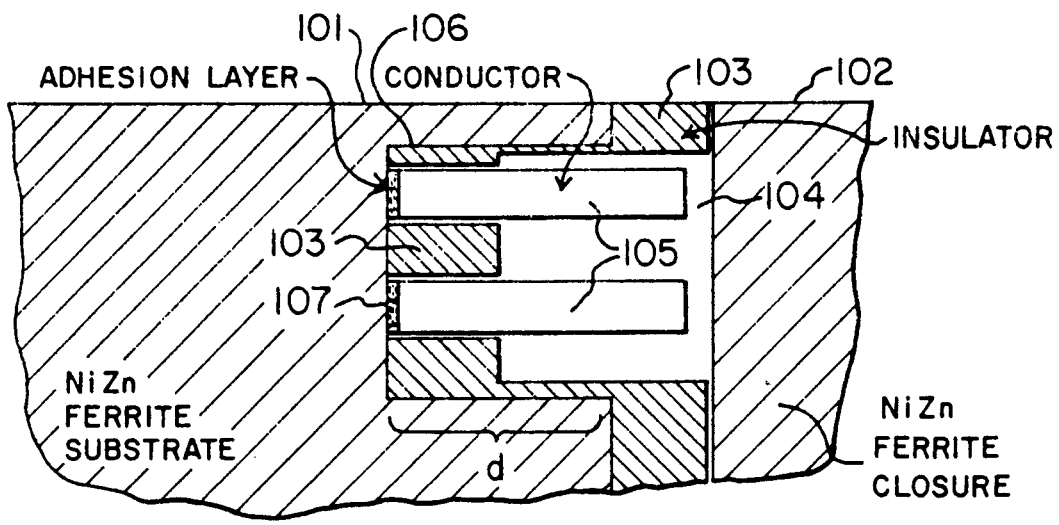
FIG. 2 illustrates in cross sectional view of the recording head of the present invention.
Figure 3:
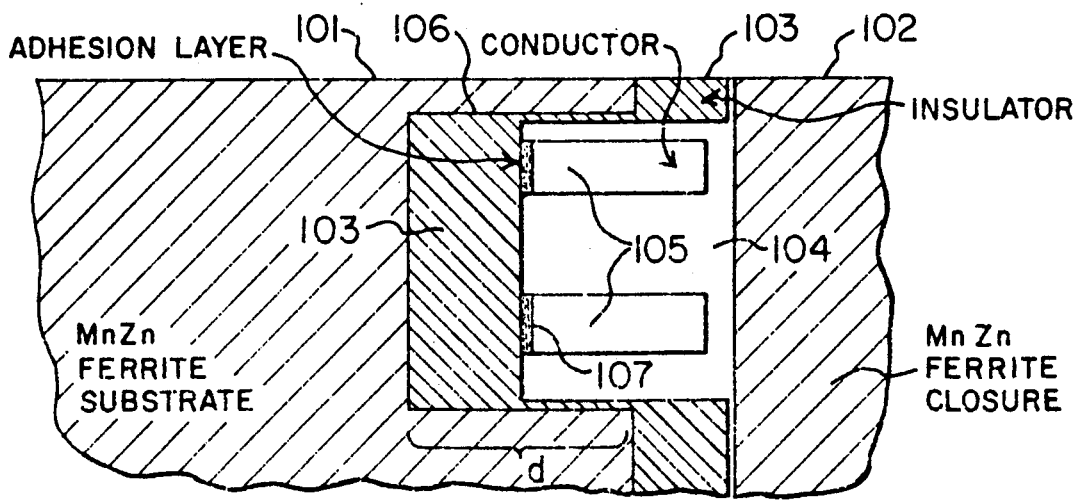
FIG. 3 illustrates an alternative embodiment of the recording head of the present invention when the substrate is a conductor.
Figure 4:
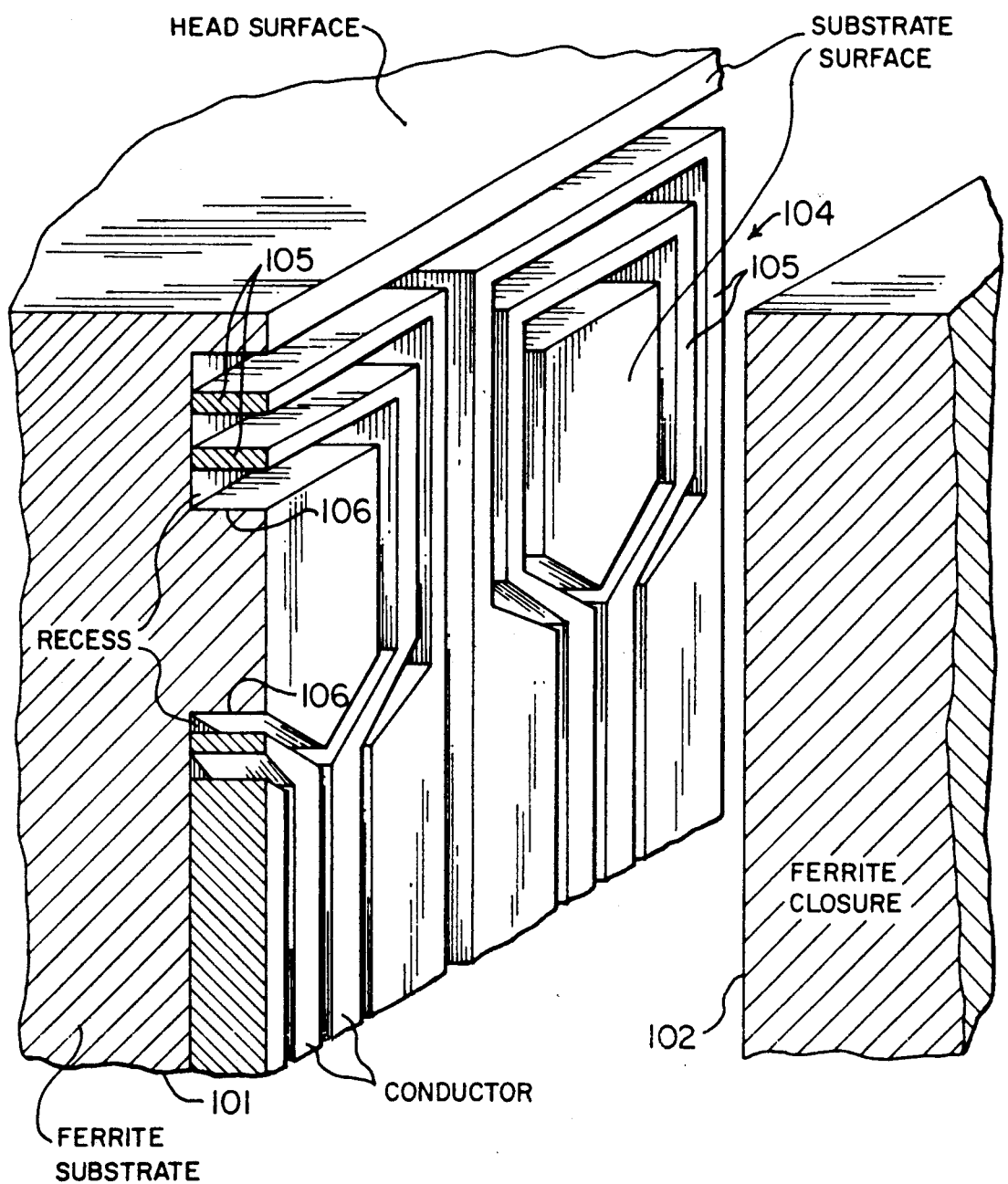
FIG. 4 illustrates a perspective view of one of the multi-turn windings in the recording head.
Figure 5:
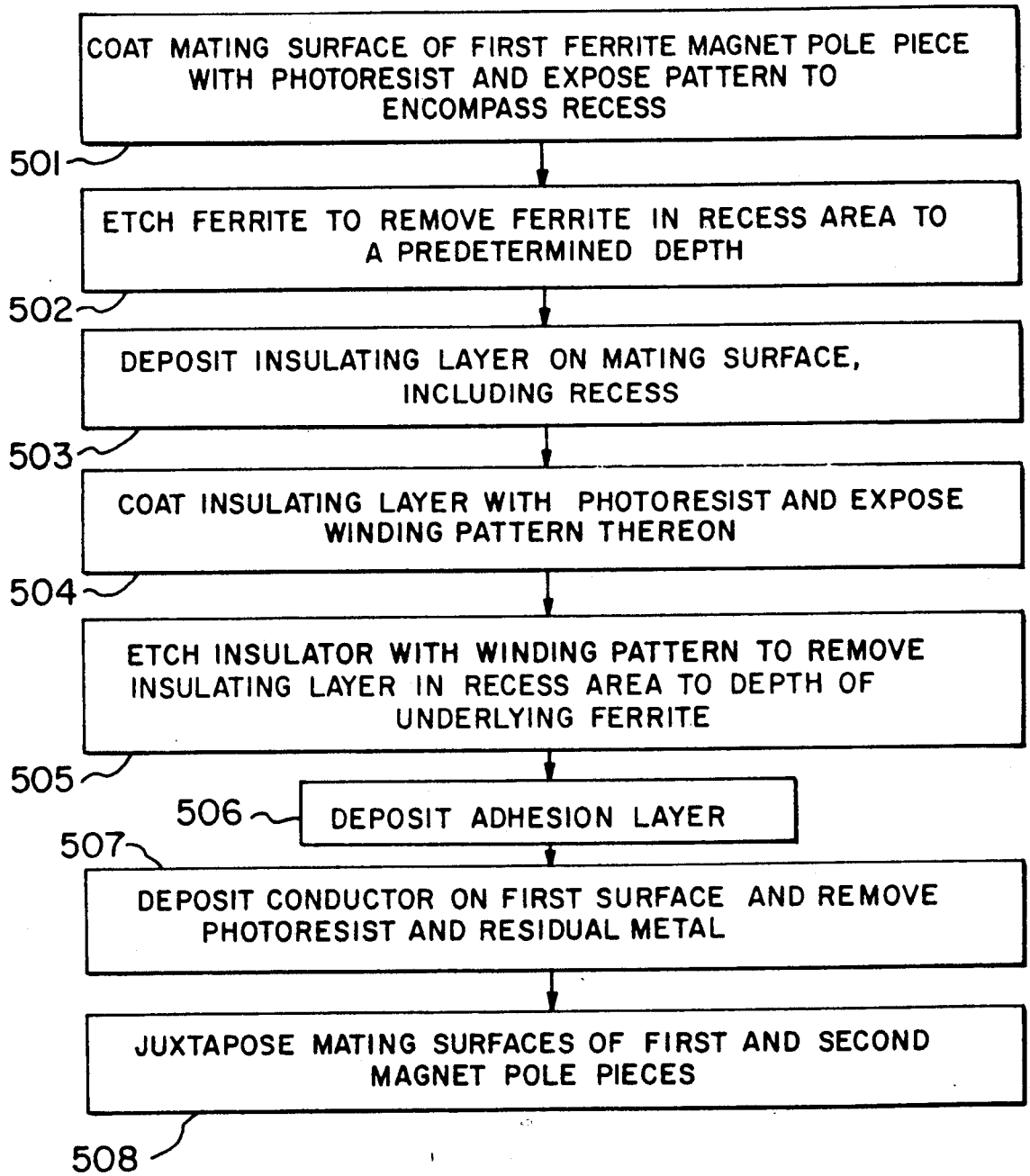
FIG. 5 illustrates in flow diagram form the operational steps taken in the manufacturing process to produce the multi-winding multi-track composite recording head.

The method of manufacturing multi-turn multi-track composite recording heads of the present invention overcomes this limitation of the prior art by etching a recess 106 into the ferrite substrate 101 surface to a depth (d) needed to allow thicker conductors 105 to be deposited therein. This allows a lower resistance to be obtained for any given winding geometry and improves the performance of the recording head. There are several specific ways of creating the recess 106 and depositing the thin film winding 104 therein and these heads are illustrated in cross sectional view in FIGS. 2 and 3. The operational steps required to produce this recording head are illustrated in flow diagram form in FIG. 5. FIG. 4 illustrates an exploded perspective view of a section of the recording head. In FIG. 4, the ferrite closure (second ferrite magnetic pole piece 102) is pulled back from the first ferrite magnetic pole piece 101 to expose the area in which the windings 104 are placed. The recess is of a geometry to include conductors 105 as well as a section 110 of substrate 101 around which conductors 105 are routed. For the purpose of clarity, insulating layer 103 is not shown.

There are several different types of ferrite used to manufacture recording heads. A first type is the NiZn ferrite heads which is illustrated in cross sectional view in FIG. 2. For these ferrite heads, a first surface of the first ferrite magnetic pole piece 101 is coated with a photoresist (step 501) and exposed to produce a pattern thereon having a geometry that incorporates the entirety of the desired winding 104, that is the winding pattern can be placed into this geometry. The exposed photoresist is ion etched at step 502 to remove the ferrite to a desired depth to form a recess 106 of predetermined dimensions. The next step 503 in the manufacturing process is to deposit an insulating layer 103 on this first surface of the first ferrite magnetic pole piece 101 to a thickness that corresponds to the final gap length (1). This insulating layer deposition is analogous to the step presently performed to manufacture thin film tape heads and produces the insulation layer 103 that separates the first 101 and second 102 ferrite magnetic pole pieces by a desired gap length (1). However, in the present method of manufacture, a photoresist is placed on the top of this insulating layer 103, which photoresist is exposed with the desired winding pattern including a resist wall profile suitable for a lift off process at step 504. The exposed section of the photoresist is etched at step 505 to remove the insulating layer 103 from the winding pattern geometry to expose the ferrite substrate 101 thereunder. Again, the step of removing the insulation layer 103 in the form of the winding pattern is similar to the step presently used to implement the recording heads. The significant difference is that the desired winding pattern is on the insulating layer 103 that is located within the recess 106 etched into the ferrite substrate 101. Therefore, when the insulating layer 103 is removed by the etch process, the ferrite substrate at the bottom of the recess 106 is exposed rather than the original surface of the substrate 101 as in the prior art recording head manufacturing technique. The desired conductor 105 is then deposited at steps 506-507 in the pattern etched into the insulating layer 103. The conductor deposition step includes depositing (step 506) an adhesion layer 107 to the ferrite substrate 101, which adhesion layer 107 can be of any suitable material, One example is titanium. A layer of a conductor 105, one example of which is gold, is then deposited (step 507) on top of the adhesion layer 107 to fill up the winding pattern etched into the insulator 103 to a desired depth. This depth can be as great as the gap length (1) plus the depth (d) of the recess. This conductor 105 thickness is significantly greater than that obtained in prior art recording heads which are limited to a thickness equal to the gap length (1). Since the resistance of a conductor is directly proportional to its cross sectional area, the increased thickness of the conductor significantly reduces the resistance of the thin film windings 104. The deposited conductor 105 is of the same configuration in number and positioning of windings as in the prior art but is of greater cross sectional area to lower the winding resistance of the recording head. The photoresist and residual metal are then removed from the surface of the first ferrite magnetic pole piece 101 and the second ferrite magnetic pole piece 102 is then juxtaposed in a mating relationship with the first ferrite magnetic pole piece 101 to implement one track of the multi-track composite recording head at step 508.

A second type of ferrite head is manufactured from MnZn and the manufacturing process for this type ferrite differs slightly from that described above. The manufacturing steps 501-504 are identical for the two types of ferrite until the insulating layer 103 is deposited on the first surface of the first ferrite substrate magnetic pole piece 101 including the recess 106 therein. With the MnZn ferrite, the insulating layer 103 is not etched (step 505) to expose the underlying ferrite substrate 101 but, instead, the conductor 105 is deposited on the surface of the insulating layer 103 in the pattern desired for the recording head windings 104, at steps 506, 507. This is shown in cross sectional view in FIG. 3. The remaining steps in the manufacturing process are identical as those disclosed above and the conductor 105 manufactured using this technique has a thickness up to the depth (d) of the recess 106 etched into the first surface of the first ferrite magnetic pole piece 101.

As is evident from this description, this method of manufacturing multi-turn multi-track composite recording heads provides a significant reduction in the resistance of the thin film windings 104 once the number of turns and pattern of the windings 104 has been selected to satisfy a desired set of operating parameters. This significant reduction in resistance of the thin film windings 104 has a commensurate increase in performance of the resultant recording head.

While a specific embodiment of this invention has been disclosed, it is expected that those skilled in the art can and will design alternate embodiments of this invention that fall within the scope of the appended claims.

I claim:

1. A method of fabricating a composite thin film recording head that includes first and second ferrite magnetic pole piece, each having a mating surface, which mating surfaces are juxtaposed together and separated by an insulating layer to form a gap of predetermined width between said first and second juxtaposed ferrite magnetic pole piece, into which gap is deposited a thin film winding, comprising the steps of:

etching said mating surface of said first ferrite magnetic pole piece that is to be juxtaposed with said mating surface of said second ferrite magnetic pole piece to form a recess in said mating surface of said first ferrite magnetic pole piece of predetermined depth and of extent to substantially encompass said thin film winding;

depositing an insulating layer on said mating surface of said first ferrite magnetic pole piece to form said gap of predetermined width;

depositing a conductor into said recess in a predetermined winding pattern to form said thin film winding; and juxtaposing said mating surface of said first ferrite magnetic pole piece with said mating surface of said second ferrite magnetic pole piece.

2. The method of claim 1 further including the step of:

etching said insulating layer, immediately following the deposition of said insulating layer, in said thin film winding pattern to expose said first ferrite magnetic pole piece.

3. The method of claim 2 wherein said step of depositing a conductor includes creating a conductor of thickness up to said recess depth plus said gap width.

4. The method of claim 2 wherein said step of depositing a conductor includes the steps of:

depositing an adhesion layer on said exposed first ferrite magnetic pole piece;

depositing a layer of conductor on top of said adhesion layer.

5. A method of fabricating a composite thin film recording head that includes first and second ferrite magnetic pole pieces, each having a mating surface juxtaposed together, and separated by an insulating layer to form a gap of predetermined width between said mating surfaces, into which gap is deposited a thin film winding, comprising the steps of:

applying a first photoresist to said mating surface of said first ferrite magnetic pole piece that is to be juxtaposed with said mating surface of said second ferrite magnetic pole piece, where said first photoresist is patterned to encompass the entire area to be occupied by said thin film winding;

etching said patterned section of said first photoresist to form a recess in said mating surface of said first ferrite magnetic pole piece of predetermined depth;

depositing an insulating layer on said mating surface of said first ferrite magnetic pole piece to form said gap of predetermined width;

applying a second photoresist to said insulating layer, where said second photoresist is patterned in said recess in said thin film winding pattern;

etching said second photoresist to remove said insulating layer in said thin film winding pattern to expose said first ferrite magnetic pole piece in said recess;

depositing a conductor of thickness up to said recess depth plus said gap width onto said exposed first ferrite magnetic pole piece;

removing any remaining said second photoresist; and juxtaposing said mating surface of said first ferrite magnetic pole with said mating surface of second ferrite magnetic pole piece.

6. The method of claim 5 wherein said step of depositing a conductor includes the steps of:

depositing an adhesion layer on said exposed first ferrite magnetic pole piece; and depositing a layer of conductor on top of said adhesion layer.

7. The method of claim 5 wherein said step of depositing a conductor includes creating a conductor of thickness up to said recess depth plus said gap width.

* * * * *